United States Patent Office

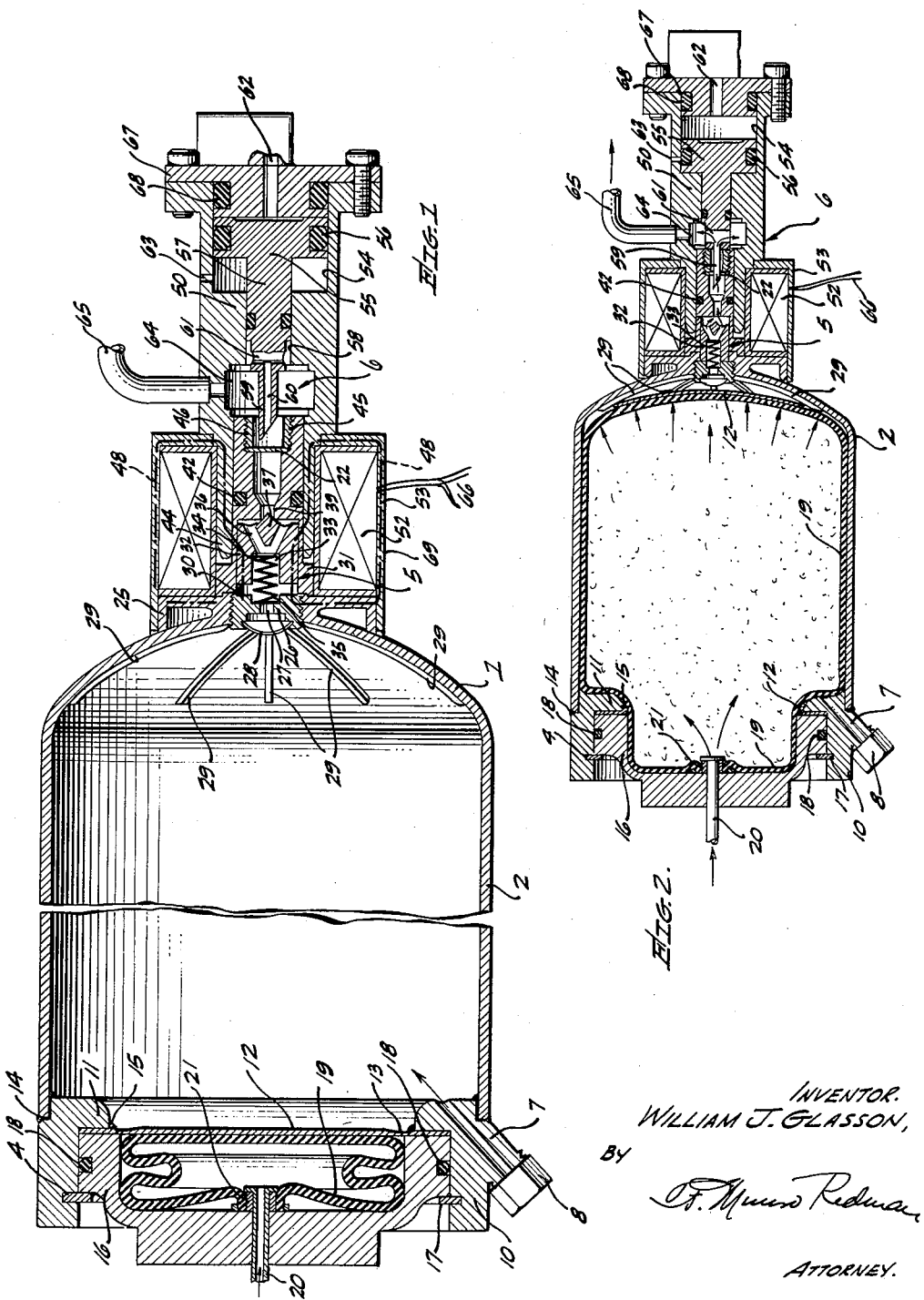

2,980,177
Patented Apr. 18, 1961

2,980,177

EXPULSION-BAG TANK FOR LIQUID PROPELLANT

William J. Glasson, Los Angeles, Calif., assignor to Hughes Aircraft Company, Culver City, Calif., a corporation of Delaware Filed Aug. 15, 1957, Ser. No. 678,760

1 Claim. (Cl. 158—50.1)

This invention relates to storage and delivery means for liquid fuels, and particularly to means for retaining and furnishing such fuels at relatively high pressures.

The invention is directly concerned with retaining a liquid propellant, such as ethylene oxide, in a tank under pressure until it is to be consumed, and then forcing it into the motor means almost instantaneously. The problem is of particular concern in devices such as rockets and guided missiles, in which the special fuel components must be supplied with great rapidity on demand. It is necessary to deliver the fuel under high pressures in order to meet the need for rapid delivery of power, and it is necessary that the propellant stay under pressures at all times. It is also necessary to deliver the fuel in a desired direction on demand. Since the attitude of the device and the direction of the accelerating forces to which it may be subjected at that time cannot be predicted in advance, a separator is required between the propellant and the pressurizing gas to insure that the former is expelled in the proper direction from its place of storage through the proper delivery conduit. However, it has been found that a commonly used propellant material, ethylene oxide, deteriorates all presently known flexible materials practical for use as a bladder or separator to contain and assist in expelling the fluid. Most other inert sealing materials are not suitable for insuring that a good seal is maintained.

Other approaches in the prior art have included the use of a piston between the pressurized gas and the propellant. This requires that a good seal be maintained about the periphery of the piston, which seal, again, may be subject to deterioration by the propellant, so that it may fail when the piston moves.

Extremely close tolerances must be maintained if there is to be any hope of the retention of pressure while permitting movement when necessary. Piston type separators also introduce an undesirable complication into the arrangement of other parts where space problems are important. The present invention overcomes these difficulties of prior art by utilizing a bladder of neoprene or the equivalent, stored in a compartment separated and sealed from the propellant by a diaphragm capable of withstanding the normal storage pressure of about 50 p.s.i., but readily rupturable at the time for delivery of the propellant. The rupture of the diaphragm is accomplished by forcing a gas, such as nitrogen, under high pressure into the bladder, inflating it until the diaphragm yields. The bladder will then expand to completely fill the fuel storage tank. There will be direct contact of the bladder with the propellant fuel at this time, but for such a relatively short time that no disabling deterioration will be experienced. The seal on the bladder compartment is provided by either soldering a thin metallic diaphragm in place, or using a plug with a conventional static seal.

Another disadvantage experienced with prior storage means has been the freezing of the valve arrangements for the discharge of propellant from the storage chamber. Such freezing primarily occurs because of the practical difficulty in excluding water vapor from the valve parts when exposed to the atmosphere.

In the present invention, the discharge-controlling valve is built into the tank so that its moving parts are within the sealed area, while the solenoid coil and a part of the magnetic path are disposed externally of the tank and separately detachable therefrom. This arrangement insures that the moving parts of the valve will always be bathed in propellant, preventing freezing. It provides means for controlling the propellant flow from the tank, for shutting off the propellant flow and confining the propellant when the tank is to be removed, and for replacement of the tank without the removal of the solenoid and the disconnection of the electrical leads.

The objects of the invention thus include making it possible to use satisfactory bladder materials in conjunction with chemically active propellant fluids.

Another object is to improve the construction of the fuel storage and delivery system for airborne devices of the guided missile type.

Another object is to make it possible to remove the tank under pressure without loss of the propellant confined therein.

These and other objects will be apparent from the detailed description following in connection with the drawings, in which:

Fig. 1 is a longitudinal sectional view of a fuel storage tank embodying this invention shown in position for retaining fuel therein; and Fig. 2 is a similar section showing the relationship of the parts after delivery of the fuel has been accomplished.

In the drawings, Fig. 1 represents a longitudinal section of a fuel storage tank and discharge valve assembly indicated generally as 1. The tank 2, which is of generally cylindrical form, has a bladder-containing end portion 4, in which are disposed the means for expelling propellant from the tank, and a control valve and delivery section, generally indicated as 5, which acts to retain the fuel within the tank until the proper discharge time. At the desired time, fuel delivery is permitted by the actuation of a seal piercing plunger assembly 6 associated with the valve and delivery section 5, through gas pressure supplied from a reaction chamber through conduit means to be described hereafter. Assembly 6 is illustrated and described to show how it cooperates with the control valve 5 but forms no part of the present invention. Its immediate function is to pierce a seal, to be described hereafter, closing off the outlet end of the fuel delivery section.

Prior to the time when fuel delivery is required, the tank 2 is filled with a propellant such as ethylene oxide, under a pressure which normally is expected to be of the order of 50 pounds per square inch. The filling is accomplished through a fuel entry fitting 7 connected by suitable conduits and valves, to a conventional ethylene oxide supply source. These conduits and valves, and the ethyleneoxide source, are not shown, being conventional in nature. A cap 8 may then be applied to retain the fuel in the tank. Tank 2 is of sufficient strength to withstand relatively high pressures, well in excess of the expulsion pressure of 840 p.s.i., which will be applied thereto at delivery time. The end portion 4 has an annular body 10, with an integrally formed inwardly extending annular shoulder portion 11, presented to the tank 2, and has seated thereagainst a metallic diaphragm 12. Annular body 10 may be fixed to the cylindrical tank body 2 by an annular weld 14, or equivalent means. Diaphragm 12 is sealed to the annular shoulder portion 11 at their junction adjacent tank 2 by means such as a solder fillet 15. The diaphragm 12 is held in place against that shoulder portion 11 by an annular bladder retaining member 16, held within body 10 by means such as a snap ring 17. An O-ring 18 may be seated about the circumference of retaining member 16 in order to assist in maintaining a tight closure between the latter and the annular body member 10 during the initial stages of expulsion of the fuel from the tank. Diaphragm 12 may be formed of brass of the order of .040 inch in thickness for the present pressures, necked down annularly to .010 inch adjacent to the inner periphery of shoulder 11. Alternatively, a two-part diaphragm, not shown, might be used. Such construction might involve a backing plate of .040 inch thickness to withstand the vapor pressure of the fuel, held directly by the retaining member 16, and of slightly lesser diameter than the inwardly extending shoulder portion 11. The backing plate would have fixed thereto a metallic diaphragm of .010 inch thickness and of diameter substantially equal to that of the retaining member 16. Pressure against the backing plate would then result in a peripheral shearing of the thin diaphragm facing the tank 2. Within retaining member 16 is disposed a neoprene bladder 19, normally folded in accordion pleated fashion, and arranged to receive an inert gas, such as nitrogen, under pressure. The nitrogen may be forced in at the time for fuel delivery through a supply pipe 20 and connecting boss 21 fixed centrally through the end of retaining member 16, which may conveniently be coaxially of the tank 2. A nitrogen supply pressure of 840 p.s.i. has been found satisfactory.

The introduction of pressure in the bladder 19 will not, of itself, produce a discharge of the ethylene oxide, since the latter is retained by the control valve assembly 5, which includes a sealing diaphragm 22. When the latter has been punctured by the piercing spear, however, the fuel may flow readily to the reaction chamber, and the valve assembly 5 opened.

The control valve assembly 5 is arranged to seal the tank 2 when not opened by the energization of solenoid means. It comprises an annular flanged mounting base 25 of high magnetic permeability suitably secured to the end of tank 2 opposite the end portion 4. The flanged mounting base 25 is secured in position by means such as welding. A center plug 26, also of high permability material, is connected threadably with both the tank and the flanged mounting base 25. Plug 26 has formed therethrough a discharge bore 27, to which entry of undesired material from tank 2 is protected by a curved filter screen 28. A plurality of radially extending ribs 29, which may be formed separately of the tank 2, or integrally therewith, are provided adjacent filter screen 28 to prevent the diaphragm 12 from covering enough of the screen to impede flow of the liquid fuel through the discharge bore 27. The discharge bore 27 is coaxial with a valve bore or cylinder 30, of substantially greater diameter, formed within a body portion 31 formed integrally with the base 25 and extending away from the tank 2. A piston type valve member 32 is slidably disposed within valve cylinder 30. Valve member 32 has an axial bore 33 formed therethrough which acts as a discharge passage when the valve is in open position and cooperates with a spring seat bore portion 34 formed in plug member 26, to act as a guide for a helical spring 35. Spring 35 is thus seated within and in compression against the screw plug 26 at one end, and against the valve member 32 at its other end. Axial bore 33 communicates with a plurality of outlet bores 36 formed symmetrically and divergently from bore 33 about the axis of the piston valve member 32. Centrally of the outlet bores 36, a conical valve portion 37 extends from valve member 32. Conical valve portion 37 is adapted to engage seatingly against a lesser diameter discharge bore portion 39 formed coaxially within body portion 31 in extension of valve cylinder 30. Thus, spring 35 will normally hold conical valve portion 37 closed seatingly against the entrance to bore 39, unless it is forced open by energization of the magnetic circuit. Body portion 31 has fitted therearound near discharge bore 39 an O-ring 42 which effects a slidable seal with a cylindrical sleeve portion 44 of an associated seal piercing assembly 6. Assembly 6 opens seal 22 at the proper time, and a portion of the structure cooperates with the magnetic circuit which operates valve 32. The discharge terminal portion 45 of the body portion 31 is threaded to receive a centrally apertured screw collar 46, the function of which is to secure in place the sealing diaphragm 22, which is the final closure element for tank 2. Any fuel which leaks past the conical valve 37 will be captured and retained by the sealing diaphragm 22.

The seal 22 is thus effective until it is penetrated by the seal piercing assembly 6 at the desired delivery time. The seal piercing assembly 6 includes a cylindrical body member 50 of high permeability material formed integrally with the cylindrical sleeve portion 44, referred to above. Sleeve portion 44 fits snugly about the discharge terminal portion 45 of the body portion 31 and within solenoid windings 52, which, in turn, are snugly fitted about the body member 31. Solenoid windings 52 are surrounded by an outer casing 53 of high permeability material which surrounds the other magnetic circuit elements. The complete magnetic circuit about solenoid windings 52 is shaped by the use of high permeability magnetic materials for flanged member 25, plug 26, piston 32, sleeve portion 44 and the outer casing 53, to follow a main flux field pattern, as indicated by the line 48 in Fig. 1. This path is such as to create a large traversing force on piston valve 32 when the solenoid 52 is energized.

The seal piercing assembly 6 includes a cylinder bore 54 in which is slidably disposed a piston 55 having peripheral sealing means 56, such as an O-ring, thereabout. A piston rod 57 disposed coaxially within the cylinder bore 54 and a piston rod bore 58 bears, at the end thereof opposite piston 55, a piercing spear 59 having a central discharge bore 60 communicating with a transverse bore 61. Pressure is applied to piston 55 through a conduit 62 from a reaction chamber, not shown, at an appropriate time. When the piston 55 has been forced by such pressure toward the tank 2 into the pistion shown in Fig. 2, spear 59 pierces the diaphragm 22. A vent hole 63 is provided in the cylinder bore 54 in order to eliminate any gaseous pressure resistance within the cylinder to movement of the piston 55. If the valve 37 is open, an outlet passage is available through the discharge bores 60 and 61 of the spear, and an annular chamber 64 formed within assembly 6, and communicating by means of a fuel conduit 65, to the reaction chamber, not shown.

The solenoid windings 52 are energized by current supplied through solenoid leads 66, simultaneously with the creation of a high pressure within a reaction chamber which will be communicated through the conduit 62 to the piston 55, and which will also be simultaneously actuated with an arrangement, not shown, for delivering nitrogen under pressure through the supply conduit 20. This actuating system, and the proper timing thereof, forms the subject matter of my co-pending application, "Fuel Supply System," Serial No. 679,796, filing date August 19, 1957, and only so much is described herein as is necessary to an understanding of the present invention. When solenoid 52 is energized, the piston valve 32 is forced open against the pressure of the spring 35. This withdraws the conical valve portion 37 from its seating contact with bore 39, and opens the fuel passage toward the diaphragm 22.

Simultaneously with the energization of solenoid 52, the pressure has been set up in conduit 62, forcing the piston 55 to travel to the position as shown in Fig. 2, penetrating the diaphragm and permitting the fuel to continue its flow through chamber 64 and conduit 65 to the reaction chamber, not shown, where it will be utilized. The conduit 62, through which pressure is supplied, is formed through an end closure plate 67 suitably secured to the assembly 6 and sealed relative to the cylinder bore 54 by means such as an O-ring 68.

The construction of the solenoid 52 and the assembly 5 is such that the magnetic flux lines tend to pass through the forwardly extending annular portion 44 of the assembly 6 and thence through the piston 32, returning through the flanged mounting base 25 to the outer shell 69 of the solenoid. These parts are all formed of high permeability magnetic material, while the body portion 31 is formed of low permeability magnetic material. This arrangement causes a concentration of the flux lines such that movement of the piston will be produced, with accompanying release of the valve portion 37, when the coil is energized.

It will be seen that with this arrangement, the tank 2 may be disconnected from the entire assembly 6 and from the solenoid 52 at any time prior to the piercing of the diaphragm 22, without releasing fuel from the tank 2 through valve 37 and outlet 39.

As soon, however, as the seal 22 is pierced, the nitrogen or other pressurizing gas supplied to tank 2 at pressures of the order of 840 p.s.i. is able to expand the bladder 19 into every portion of the tank 2, forcing the propellant out through conduit 65 to the reaction chamber for utilization.

It will be thus seen that there has been provided a simple mechanism for retaining a type of fuel tending to corrode flexible materials, in a storage tank without danger of affecting deleteriously a propulsion member designed to force the fuel into an engine for consumption at a desired time.

The valve arrangement described permits the disconnection and removal of the tank from seal piercing means and from the solenoid coils used to control the discharge valve without a loss of pressure from the tank. At the same time, the mechanism described is so simple in nature that relatively few moving parts are used and the outlet valve assembly itself is not subject to disability through freezing, since all of the moving parts may be continuously surrounded by the propellant fuel.

What is claimed is:

In a fuel supply system, means for storing fuel under pressure while permitting delivery at a prescribed time, comprising: a fuel storage tank; a propulsion bag compartment formed in a portion of said tank; a rupturable diaphragm sealing said bag compartment from the remainder of said storage tank; an inflatable bag of resilient, impermeable material disposed in said compartment; means for supplying propelling gas, of the class of nitrogen, under pressure to said inflatable bag; means for supplying liquid fuel, of the class of ethylene oxide under pressure to said tank; a fuel delivery bore formed in said tank opposite said bag compartment; a strainer element disposed about said fuel delivery bore; a piston valve slidably disposed within said fuel delivery bore and having a central opening therethrough adapted to receive spring means for positioning said piston valve, said piston valve being adapted to close said delivery bore in one position and to permit the passage of said liquid fuel in other positions; resilient means for normally maintaining said piston valve in a position substantially to prevent egress of said fuel; and another rupturable diaphagram positioned downstream from said piston valve for sealing said fuel delivery bore to prevent loss of material leaking past said valve means, said last mentioned diaphragm being of sufficient strength to withstand maximum pressure of said fuel passing through said piston valve.

References Cited in the file of this patent

UNITED STATES PATENTS

| | | |
|---|---|---|
| 2,402,826 | Lubbock | June 25, 1946 |
| 2,542,929 | Kimball | Feb. 10, 1951 |
| 2,546,325 | Wasserlein | Mar. 27, 1951 |
| 2,822,667 | Drexel | Feb. 11, 1958 |
| 2,859,808 | Youngquist et al. | Nov. 11, 1958 |